(12) United States Patent
Peng et al.

(10) Patent No.: US 9,983,987 B2
(45) Date of Patent: May 29, 2018

(54) METHOD, APPARATUS, AND DEVICE FOR LOCATING A SOFTWARE FAILURE

(71) Applicant: IYUNTIAN CO., LTD., Beijing (CN)

(72) Inventors: Yunpeng Peng, Beijing (CN); Xinjia Guo, Beijing (CN)

(73) Assignee: IYUNTIAN CO., LTD., Beijing (CN)

(*) Notice: Subject to any disclaimer, the term of this patent is extended or adjusted under 35 U.S.C. 154(b) by 0 days. days.

(21) Appl. No.: 14/902,476

(22) PCT Filed: Dec. 19, 2014

(86) PCT No.: PCT/CN2014/094302
§ 371 (c)(1),
(2) Date: Apr. 21, 2016

(87) PCT Pub. No.: WO2015/154517
PCT Pub. Date: Oct. 15, 2015

(65) Prior Publication Data
US 2017/0075800 A1    Mar. 16, 2017

(30) Foreign Application Priority Data

Apr. 8, 2014 (CN) .......................... 2014 1 0138417

(51) Int. Cl.
*G06F 11/00* (2006.01)
*G06F 11/36* (2006.01)

(52) U.S. Cl.
CPC .......... *G06F 11/3688* (2013.01); *G06F 11/36* (2013.01); *G06F 11/3692* (2013.01)

(58) Field of Classification Search
CPC .. G06F 11/3688; G06F 11/36; G06F 11/3692; G06F 11/302; G06F 11/3604; G06F 11/3612
(Continued)

(56) References Cited

U.S. PATENT DOCUMENTS 6,298,457 B1* 10/2001 Rachlin ............... G06F 11/0748
714/12
8,677,174 B2* 3/2014 Bobak .................... G06Q 10/06
705/7.11
(Continued)

FOREIGN PATENT DOCUMENTS

CN        101046765 A       10/2007
CN        102184138 A        9/2011
(Continued)

OTHER PUBLICATIONS

PCT/CN2014/094302 English Translation of the International Search Report, dated Mar. 6, 2015, 2 pages.

*Primary Examiner* — Joseph D Manoskey
(74) *Attorney, Agent, or Firm* — Lathrop Gage LLP

(57) ABSTRACT

A method, apparatus, and device for locating a software failure are disclosed. The method comprises: determining a locating start time; obtaining a system environment at the locating start time; reproducing a running state of the software from the locating start time to an occurrence time of a software failure in the system environment at the locating start time; determining a cause of the software failure based on the reproduced running state. The apparatus comprises: a determination module, an obtaining module, a reproduction module, and an analysis module. Through this approach, automatic locating of a software failure is implemented, which helps the user to be aware of the operation problem and facilitates a software developer to find a deficiency in the software design.

19 Claims, 2 Drawing Sheets

(58) Field of Classification Search
USPC ..................................... 714/38.1, 25, 26, 46
See application file for complete search history.

(56) References Cited

U.S. PATENT DOCUMENTS

| | | | |
|---|---|---|---|
| 2005/0071760 A1* | 3/2005 | Jaeger | G06F 9/4446 |
| | | | 715/705 |
| 2009/0089404 A1* | 4/2009 | Guo | H04L 67/02 |
| | | | 709/219 |
| 2011/0029818 A1 | 2/2011 | Saito | |
| 2011/0066704 A1 | 3/2011 | Nakamura | |

FOREIGN PATENT DOCUMENTS

| | | |
|---|---|---|
| CN | 102902625 A | 1/2013 |
| CN | 103902454 A | 7/2014 |
| JP | 2009205502 A | 9/2009 |
| JP | 2009223743 A | 10/2009 |

* cited by examiner

METHOD, APPARATUS, AND DEVICE FOR LOCATING A SOFTWARE FAILURE

RELATED APPLICATIONS

The present patent application is a national phase of PCT application No. PCT/CN2014/094302, which claims the priority to the Chinese patent application No. 201410138417.4 entitled "Method and Apparatus for Locating a Software Failure" filed by IYUNTIAN Co., Ltd. on Apr. 8, 2014, the entire content of both applications is incorporated herein by reference.

FIELD OF THE INVENTION

The present invention relates to the computer field, and in particular to a method, apparatus, and device for locating a software failure.

BACKGROUND OF THE INVENTION

In the prior art, when software execution in a computer fails, what can be done is only waiting for the software to automatically resume or forcibly suspending the software from running. There is no means for the user to determine the cause of the software failure, for example, whether the software failure is caused by the user's operation or by the software per se. If it is the user's operation that causes the software failure, but the user is not aware of it, the same user's operation will also cause the software failure the next time. Even if the user turns to a software developer for help, the developer may also not be able to locate the cause of the failure.

SUMMARY OF THE INVENTION

In some embodiments, the present invention provides a method, apparatus, and device for locating a software failure.

In order to achieve the above objective, in one aspect, the embodiments of the present invention provide a method for locating a software failure, comprising:
determining a locating start time;
obtaining a system environment at the locating start time;
reproducing a running state of software from the locating start time to an occurrence time of a software failure in the system environment at the locating start time; and
determining a cause of the software failure based on the reproduced running state.

In another aspect, the embodiments of the present invention provide an apparatus for locating a software failure, comprising:
a determination module configured to determine a locating start time;
an obtaining module configured to obtain a system environment at the locating start time;
a reproduction module configured to reproduce a running state of the software from the locating start time to an occurrence time of a software failure in the system environment at the locating start time; and
an analysis module configured to determine a cause of the software failure based on the reproduced running state.

In a further aspect, the embodiments of the present invention further provide a device, comprising:
one or more processors;
a memory;

one or more programs that are stored in the memory and perform the following operations when being executed by the one or more processors:
determining a locating start time;
obtaining a system environment at the locating start time;
reproducing a running state of the software from the locating start time to an occurrence time of a software failure in the system environment at the locating start time; and
determining a cause of the software failure based on the reproduced running state.

Thus, accordingly to certain embodiments, the solutions provided herein implement automatic locating of a software failure, help users to be aware of operation problems, and facilitate software developers in finding deficiencies in the software design.

BRIEF DESCRIPTION OF THE ACCOMPANYING DRAWINGS

By reading the detailed description of the non-limiting embodiments with reference to the accompanying drawings, other features, objectives and advantages of the present invention will become more apparent:

DETAILED DESCRIPTION OF CERTAIN EMBODIMENTS

Figure 1:
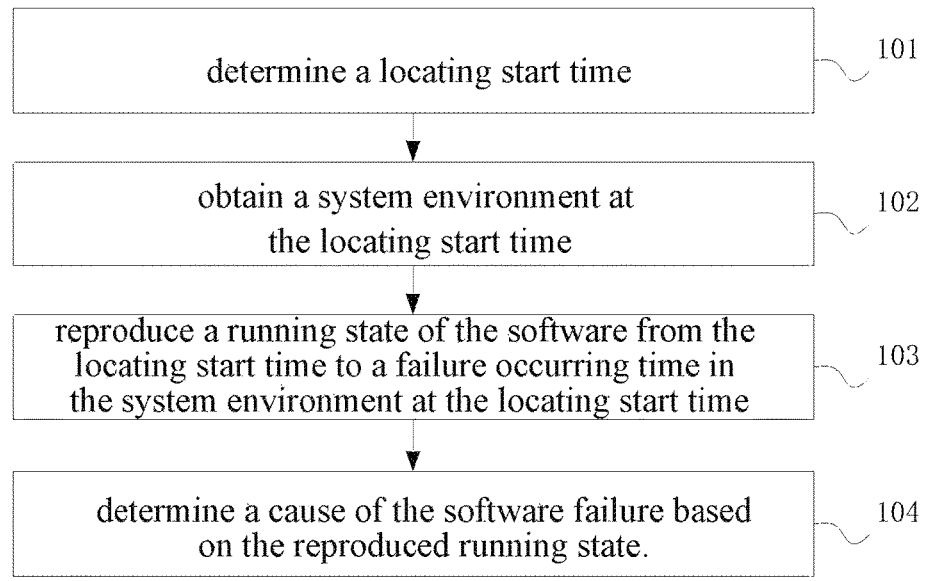
FIG. 1 shows a flow diagram of a method for locating a software failure according to a first embodiment of the present invention.

To further the understanding of the objectives, technical solutions and advantages of the present invention, the embodiments of the present invention will be described in further details with reference to the accompanying drawings.

Hereinafter, the embodiments of the present invention will be described in details. The examples in the embodiments are illustrated in the drawings, wherein same or similar reference numerals always represent same elements, similar elements or elements having same or similar functions. Hereinafter, the embodiments as described with reference to the accompanying drawings are exemplary, only for explaining the present invention, and not intended to limit the present invention. On the contrary, the embodiments of the present invention include all variations, modifications and equivalents falling into the spirit and scope of the appended claims.

In the description of the present invention, it should be noted that terms "first" and "second" are only for descriptive purposes, and are not to be understood as indicating or suggesting a relative importance. In the description of the present invention, it should be noted that unless otherwise prescribed and defined, the terms "couple" or "connect", or the variations thereof such as "connection" and "coupling", should be understood in a broader sense, e.g., it may be a fixed connection, a detachable connection, or an integrated connection; it may also be a mechanical connection, or an electrical connection; a direct connection, or an indirect connection via an intermediate medium. For an ordinary person skilled in the art, the specific meanings of the above terms in the present invention may be understood dependent on specific situations. In addition, in the description of the present invention, unless otherwise indicated, the meaning of "plural" or "plurality" is two or more.

Any procedure or method described in the flow diagrams or other means herein may be understood as a module, a segment or a section including codes of one or more executable instructions for implementing a specific logic function or a step of a procedure. The scope of the preferred embodiments of the present invention covers other implementations, whereby the sequence as illustrated or discussed might not be followed, including performing the involved functions substantially in parallel or in reverse order, which should be understood by those skilled in the technical art of the embodiments of the present invention.

First Embodiment

FIG. 1 shows a flow diagram of a method for locating a software failure according to the first embodiment of the present invention. As shown in FIG. 1, the method comprises:

101. determining a locating start time;

102. obtaining a system environment at the locating start time;

103. reproducing a running state of the software from the locating start time to an occurrence time of a software failure in the system environment at the locating start time; and 104. determining a cause of the software failure based on the reproduced running state.

In some embodiments, the determining the locating start time mentioned at step 101, the locating start time is not the same concept as the start time of running the software. The present invention provides a method for determining the locating start time as follows:

segmenting the current running period before the software failure into a plurality of time segments; and selecting the start time of the i-th time segment as the locating start time, wherein i is a natural number.

In some embodiments, the time period from the start time of running the software to the occurrence time of the software failure is considered as the normal software running time T, and the running time T is segmented into a plurality of time segments. The running time T may be segmented equally or randomly. The present disclosure has no limitation thereto. The start time of the i-th time segment is selected as the locating start time, wherein i is a natural number. The natural number i here is generally first selected from the time segment closest to the occurrence time of the software failure. This selection approach is to make the reproduction procedure at step 103 as short as possible, so as to avoid too much influence on the user's system performance.

In some embodiments, within the normal software running time T, a correlation between time points and system environments may be continuously saved, such that the system environment can be obtained based on the locating start time at step 102.

At step 103, the running state of the software from the locating start time to the occurrence time of the software failure is reproduced. In particular, step 103 comprises: reproducing the running state from the locating start time to the occurrence time of the software failure based on recorded mouse click events from the locating start time to the occurrence time of the software failure.

In some embodiments, before reproducing the running state from the locating start time to the occurrence time of the software failure, the invalid click events in the recorded mouse click event are removed, thereby obtaining effective click events. In this way, the reproduction efficiency in step 103 may be further improved.

It should also be noted that determining the cause of the software failure based on the reproduced running state comprises:

re-determining the locating start time, if the reproduced running state does not correspond to the running state at the occurrence time of the software failure; and analyzing the effective click events to determine the execution logic of the software, if the reproduced running state corresponds to the running state at the occurrence time of the software failure, and further locating the cause of the software failure.

In some embodiments, automatic locating of the software failure is performed by reproducing the software running state within a certain period of time before the occurring of the failure, which does not need to occupy too many resources, thereby facilitating the user to be aware of the operation problem and helping the software developer to find a deficiency in the software design.

It should also be noted that the method provided by the present invention may be implemented as computer program software. For example, the embodiment according to the present invention may be a computer program product. Running the program product causes the computer to execute the illustrated method. The computer program product includes a computer readable storage medium that contains a computer program logic or code part for implementing the method. The computer storage medium may be an inbuilt medium installed in the computer or a removable medium (e.g., a hot-swap storage device) that may be removed from the computer body. The inbuilt medium includes, but is not limited to, a rewritable non-volatile memory, e.g., a RAM, a ROM, a flash memory, and a hard disk. The removable medium includes, but not limited to, an optic memory medium (e.g., CD-ROM and DVD), a magnetic-optic storage medium (e.g., MO), a magnetic storage medium (e.g., cassette or mobile hard disk), a medium (e.g., a memory card) having an inbuilt rewritable non-volatile memory and a medium (e.g., ROM cassette) having an inbuilt ROM.

Second Embodiment

Figure 2:
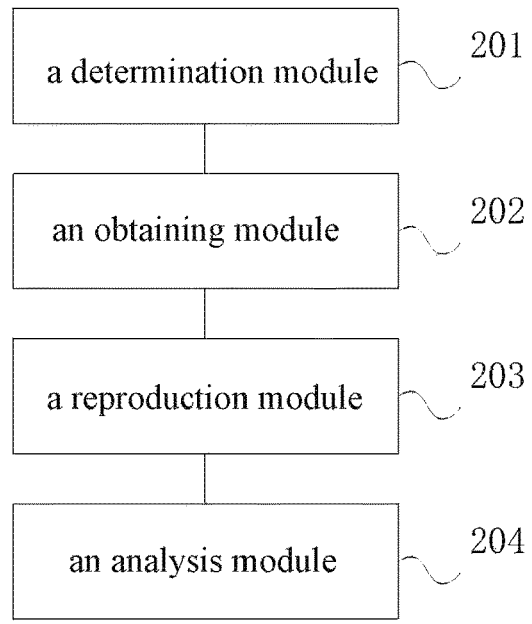
FIG. 2 shows a structural diagram of an apparatus for locating a software failure according to a second embodiment of the present invention.

FIG. 2 shows a structural diagram of an apparatus for locating a software failure provided in the second embodiment of the present invention. As shown in FIG. 2, the apparatus is an execution principal of the above-described method embodiment. The method steps may refer to the description in the above embodiment and will not be repeated here. The apparatus comprises:

a determination module 201 configured to determine a locating start time;

an obtaining module 202 configured to obtain a system environment at the locating start time;

a reproduction module 203 configured to reproduce a running state of the software from the locating start time to an occurrence time of a software failure in the system environment at the locating start time; and an analysis module 204 configured to determine a cause of the software failure based on the reproduced running state.

In one embodiment, the determination module 201 comprises:

a segmentation unit configured to segment the current running period before the software failure into a plurality of time segments; and a selection unit configured to select the start time of the i-th time segment as the locating start time, wherein i is a natural number.

In a further embodiment, the reproduction module 203 comprises:

a reproduction unit configured to reproduce the running state from the locating start time to the occurrence time of the software failure based on the recorded mouse click events from the locating start time to the occurrence time of the software failure in the system environment at the locating start time.

Based on the above embodiment, the reproduction module 203 further comprises:

an obtaining unit configured to remove an invalid click event from the recorded mouse click events, thereby obtaining effective click events.

Based on any one of the above embodiments, the determination module 201 is further configured to:

re-determine the locating start time if the running state reproduced by the reproduction module 203 does not correspond to the running state at the occurrence time of the software failure.

The apparatus for locating a software failure as provided in the present invention performs automatic locating a software failure by reproducing the software running state within a time period before the failure occurring, which does not need to occupy too much resources, facilitates the user's awareness of the operation problem, and helps the software developers to find the deficiencies in the software design.

Third Embodiment

Certain embodiments of the present invention further provide a non-volatile computer storage medium that stores one or more program and causes a device to perform the following operations when the one or more program are executed by the device:

determining a locating start time;

obtaining a system environment at the locating start time;

reproducing a running state of the software from the locating start time to an occurrence time of a software failure in the system environment at the locating start time; and determining a cause of the software failure based on the reproduced running state.

In another embodiment, when the storage medium performs the above operations using the device, the determining the locating start time comprises:

segmenting the current running period before the software failure into a plurality of time segments; and selecting the start time of the i-th time segment as the locating start time, wherein i is a natural number.

In some embodiments, the reproducing the running state from the locating start time to the occurrence time of the software failure specifically comprises:

reproducing the running state from the locating start time to the occurrence time of the software failure based on recorded mouse click events from the locating start time to the occurrence time of the software failure.

In another embodiment, before reproducing the running state from the locating start time to the occurrence time of the software failure, an invalid click event in the recorded mouse click events is removed, thereby obtaining effective click events.

In another embodiment, the determining the cause of the software failure based on the reproduced running state, comprises:

re-determining the locating start time if the reproduced running state does not correspond to the running state at the occurrence time of the software failure.

Fourth Embodiment

Figure 3:
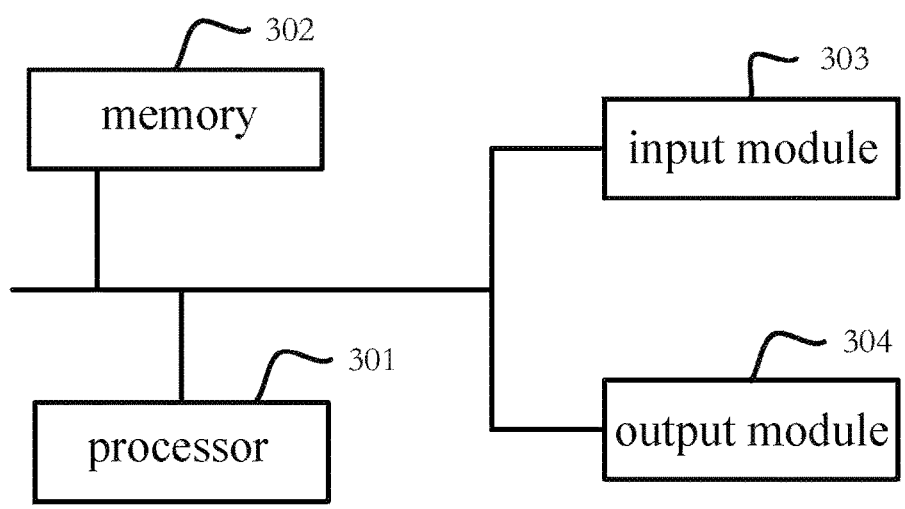
FIG. 3 shows a hardware structural diagram of a device according to a fourth embodiment of the present invention.

With reference to FIG. 3, certain embodiments of the present invention provide a hardware structure of a device. The device comprises a processor 301, a memory 302, an input device 303, and an output device 304. The number of processors 301 in the device may be one or more. FIG. 3 provides one processor 301 as an example. The processor 301, the memory 302, the input module 303, and the output module 304 in the device may be connected via a bus or through other approaches. FIG. 3 provides the bus connection as an example.

The memory 302, as a computer readable medium, may be used for storing software programs, computer executable programs, and modules, e.g., a program instructions/units corresponding to the method locating a software failure in the embodiments of the present invention (e.g., the determination module 201, the obtaining module 202, the reproduction module 203, and the analysis module 204 in the apparatus for locating a software failure as shown in FIG. 2). The processor 301 executes the software programs, instructions, and modules stored in the memory 302, thereby performing various functional applications and data processing of the terminal device, i.e., the method for locating a software failure in the method embodiment.

The memory 302 may comprise a program storage area and a data storage area, wherein the program storage area may store an operating system, and an application required by at least one function. The data storage area may store data created based on the use of the terminal device. In addition, the memory 302 may include a high speed random access memory and may also include a non-volatile memory, e.g., at least one magnetic disk memory device, a flash memory device, or other non-volatile storage device. In some instances, the memory 302 may further comprise a memory remote from the processor 310. The remote memory may be connected to the terminal device via the network. The instances of the above network include, but are not limited to, the Internet, an intranet, a local area network, a mobile communication network, and a combination thereof.

The input device 303 may be used for receiving input numeric or character information and for generating key signal inputs associated with the user settings and the function controls of the terminal. The output module 304 may comprise a display device such as a display screen.

In another embodiment, the above apparatus comprises:

one or more processors;

a memory;

one or more modules that are stored in the memory and perform the following operations when being executed by the one or more processors:

determining a locating start time;

obtaining a system environment at the locating start time;

reproducing a running state of the software from the locating start time to an occurrence time of a software failure in the system environment at the locating start time; and determining a cause of the software failure based on the reproduced running state.

In another embodiment, the determining the locating start time comprises:

segmenting the current running period before the software failure into a plurality of time segments; and selecting the start time of the i-th time segment as the locating start time, wherein i is a natural number.

In another embodiment, the reproducing the running state of the software from the locating start time to the occurrence time of the software failure specifically comprises:

reproducing the running state from the locating start time to the occurrence time of the software failure based on recorded mouse click events from the locating start time to the occurrence time of the software failure.

In another embodiment, before reproducing the running state from the locating start time to the occurrence time of the software failure, an invalid click event in the recorded mouse click events is removed, thereby obtaining effective click events.

In another embodiment, the determining the cause of the software failure based on the reproduced running state, comprising:

re-determining the locating start time if the reproduced running state does not correspond to the running state at the occurrence time of the software failure.

Through the above description of the embodiments, those skilled in the art may clearly understand that the present invention may be implemented in the software and the requisite general hardware, and naturally also implemented in the hardware. However, in most cases, the former may be a more suitable implementation approach. Based on this understanding, the technical solution of the present invention essentially, or the contributing part in view of the prior art, may be embodied in the form of a software product. The computer software product may be stored in the computer readable medium, e.g., a floppy disk of the computer, a read-only memory (ROM), a random access memory (RAM), a flash disk, a hard disk or an optical disk, etc., including a plurality of instructions to enable a computer device (which may be a personal computer, a server, or a network device, etc.) to perform the method according to the various embodiments of the present invention.

It should be noted that in the embodiment of the apparatus for locating a software failure, although the respectively included units and modules are partitioned by functional logic, the embodiment is not limited to the above partition, as long as the corresponding functions can be implemented. Additionally, the respective names of the functional units are only intended to distinguish from each other, but not to limit the scope of the present invention.

The above descriptions are only specific embodiments of the present invention. The protection scope of the present invention is not limited thereto. Any changes or replacements that may be easily conceived of by any person of ordinary skill in the art within the technical scope of the present disclosure should be covered within the scope of the present invention. Therefore, the scope of the present invention should be governed by the protection scope of the claims.

The invention claimed is:

1. A computer-implemented method for locating a software failure on a computer comprising a processor, the method comprising:
    continuously saving, using the processor, a correlation between time points and system environments within normal software running time;
    determining, using the processor, a locating start time within the normal software running time;
    obtaining, using the processor, one of the system environments at the locating start time;
    reproducing, using the processor, a running state of the software from the locating start time to an occurrence time of a software failure in the obtained system environment at the locating start time; and
    determining, using the processor, a cause of the software failure based on the reproduced running state.

2. The method according to claim 1, wherein the determining the locating start time comprises:
    segmenting, using the processor, a current running period before the software failure into a plurality of time segments; and
    selecting, using the processor, a start time of an i-th time segment as the locating start time, wherein i is a natural number, and the i-th time segment is one of the plurality of time segments, which is closest to the occurrence time of the software failure.

3. The method according to claim 2, wherein the reproducing, using the processor, the running state of the software from the locating start time to the occurrence time of the software failure comprises:
    reproducing the running state from the locating start time to the occurrence time of the software failure based on recorded mouse click events from the locating start time to the occurrence time of the software failure.

4. The method according to claim 3, wherein before reproducing the running state from the locating start time to the occurrence time of the software failure, an invalid click event is removed from the recorded mouse click events, thereby obtaining an effective click event.

5. The method according to claim 4, wherein the determining the cause of the software failure based on the reproduced running state comprising:
    re-determining, using the processor, the locating start time if the reproduced running state does not correspond to the running state at the occurrence time of the software failure;
    analyzing, using the processor, effective click events to determine an execution logic of the software if the reproduced running state corresponds to the running state at the occurrence time of the software failure, and
    locating, using the processor, the cause of the software failure.

6. The method according to claim 3, wherein the determining the cause of the software failure based on the reproduced running state comprising:
    re-determining, using the processor, the locating start time if the reproduced running state does not correspond to the running state at the occurrence time of the software failure;
    analyzing, using the processor, the effective click events to determine an execution logic of the software if the reproduced running state corresponds to the running state at the occurrence time of the software failure, and
    locating, using the processor, the cause of the software failure.

7. The method according to claim 2, wherein the determining the cause of the software failure based on the reproduced running state comprising:
    re-determining, using the processor, the locating start time if the reproduced running state does not correspond to the running state at the occurrence time of the software failure;
    analyzing, using the processor, effective click events to determine an execution logic of the software if the reproduced running state corresponds to the running state at the occurrence time of the software failure, and
    locating, using the processor, the cause of the software failure.

8. The method according to claim 1, wherein the reproducing the running state of the software from the locating start time to the occurrence time of the software failure comprises:
reproducing, using the processor, the running state from the locating start time to the occurrence time of the software failure based on recorded mouse click events from the locating start time to the occurrence time of the software failure.

9. The method according to claim 8, wherein before reproducing the running state from the locating start time to the occurrence time of the software failure, an invalid click event is removed from the recorded mouse click events, thereby obtaining an effective click event.

10. The method according to claim 9, wherein the determining the cause of the software failure based on the reproduced running state comprising:
re-determining, using the processor, the locating start time if the reproduced running state does not correspond to the running state at the occurrence time of the software failure;
analyzing, using the processor, effective click events to determine an execution logic of the software if the reproduced running state corresponds to the running state at the occurrence time of the software failure, and
locating, using the processor, the cause of the software failure.

11. The method according to claim 8, wherein the determining the cause of the software failure based on the reproduced running state comprising:
re-determining, using the processor, the locating start time if the reproduced running state does not correspond to the running state at the occurrence time of the software failure;
analyzing, using the processor, effective click events to determine an execution logic of the software if the reproduced running state corresponds to the running state at the occurrence time of the software failure, and
locating, using the processor, the cause of the software failure.

12. The method according to claim 1, wherein the determining the cause of the software failure based on the reproduced running state comprising:
re-determining, using the processor, the locating start time if the reproduced running state does not correspond to the running state at the occurrence time of the software failure;
analyzing, using the processor, effective click events to determine an execution logic of the software if the reproduced running state corresponds to the running state at the occurrence time of the software failure, and
locating, using the processor, the cause of the software failure.

13. An apparatus for locating a software failure, comprising:
a processor; and
a memory storing instructions, which when executed by the processor, cause the processor to perform operations, the operations comprising:
continuously saving a correlation between time points and system environments within normal software running time;
determining a locating start time within the normal software running time;
obtaining one of the system environments at the locating start time, based on the correlation between the time points and the system environments;
reproducing a running state of the software from the locating start time to an occurrence time of a software failure in the obtained system environment at the locating start time; and
determining a cause of the software failure based on the reproduced running state.

14. The apparatus according to claim 13, wherein the determining a locating start time comprises:
segmenting a current running period before the software failure into a plurality of time segments; and
selecting a start time of an i-th time segment as the locating start time, wherein i is a natural number, and the i-th time segment is one of the plurality of time segments, which is closest to the occurrence time of the software failure.

15. The apparatus according to claim 14, wherein the reproducing a running state of the software from the locating start time to an occurrence time of a software failure comprises:
reproducing the running state from the locating start time to the occurrence time of the software failure based on recorded mouse click events from the locating start time to the occurrence time of the software failure.

16. The apparatus according to claim 15, wherein the reproducing a running state of the software from the locating start time to an occurrence time of a software failure further comprises:
removing an invalid click event from the recorded mouse click events, thereby obtaining an effective click event.

17. The apparatus according to claim 13, wherein the reproducing a running state of the software from the locating start time to an occurrence time of a software failure comprises:
reproducing the running state from the locating start time to the occurrence time of the software failure based on recorded mouse click events from the locating start time to the occurrence time of the software failure.

18. The apparatus according to claim 17, wherein the reproducing a running state of the software from the locating start time to an occurrence time of a software failure further comprises:
removing an invalid click event from the recorded mouse click events, thereby obtaining an effective click event.

19. The apparatus according to claim 13, wherein the determining a cause of the software failure based on the reproduced running state comprises:
determining the locating start time if the reproduced running state does not correspond to the running state at the occurrence time of the software failure;
analyzing effective click events to determine an execution logic of the software if the reproduced running state corresponds to the running state of the occurrence time of the software failure; and
locating the cause of the software failure.

* * * * *